April 15, 1952 P. H. DANLY ET AL 2,593,116
POWER PRESS FLYWHEEL BEARING LUBRICATING SYSTEM
Filed March 30, 1949
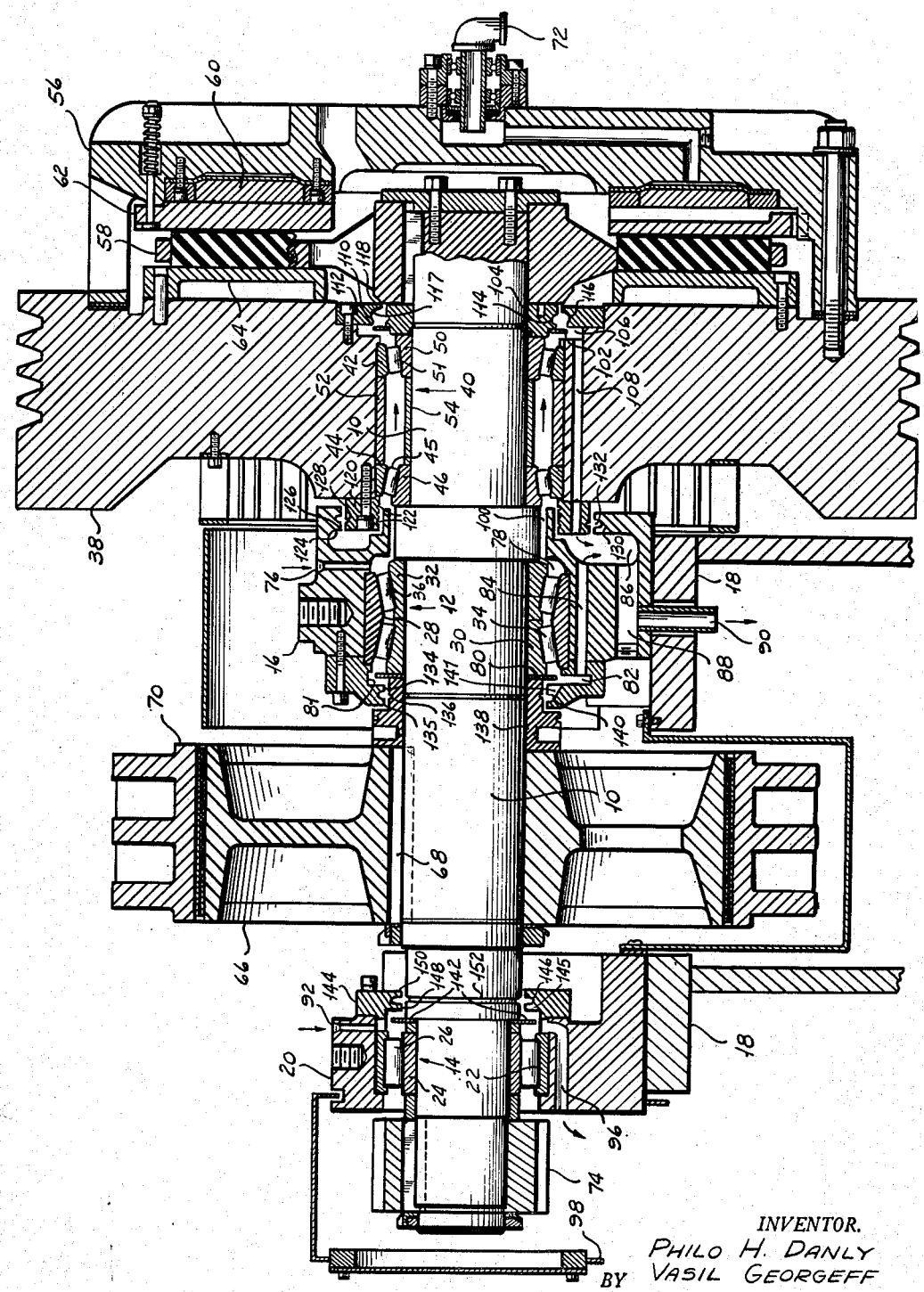
INVENTOR.
PHILO H. DANLY
BY VASIL GEORGEFF
Henry L. Shenier
ATTORNEY Patented Apr. 15, 1952

2,593,116

UNITED STATES PATENT OFFICE 2,593,116

POWER PRESS FLYWHEEL BEARING LUBRICATING SYSTEM

Philo H. Danly, Hinsdale, and Vasil Georgeff, Chicago, Ill., assignors to Danly Machine Specialties, Inc., Chicago, Ill., a corporation of Illinois Application March 30, 1949, Serial No. 84,386

6 Claims. (Cl. 184—6)

Our invention relates to a power press flywheel bearing lubricating system, and more particularly to an improved lubricating system for power press flywheels, in which a lubricant is continuously circulated to the flywheel bearing.

This application is an improvement over our co-pending application, Serial No. 16,898, filed March 25, 1948, now Patent No. 2,565,750.

Power presses are employed for forming or shaping metal. They are expensive pieces of equipment and are often included in a production line. Not only is it desirable to lengthen their life by proper lubrication, but if failure occurs in a power press forming part of a production line, the interruption of operations of the entire line represents a considerable economic loss.

In the operation of power presses, a continuously running flywheel is driven from a suitable prime mover and is adapted to be clutched to and unclutched from a power train driving an eccentric or a crank.

In the power presses of the prior art, the flywheel bearings have been lubricated by a grease as distinguished from a more fluid lubricant, such as a lubricating oil. The grease was supplied to the flywheel bearing by means of a grease cup. If insufficient pressure is applied to the grease, insufficient lubrication frequently results. If too much pressure is applied to the grease, the grease seals are apt to rupture and thus permit the grease to leak on to the clutch surfaces and cause slipping. When this occurs a major repair task is required to disassemble the clutch and replace the ruptured grease seals, and either clean or replace the clutch lining and the clutch surfaces. Furthermore, increased pressure of the grease will increase the heat generated by the flywheel bearing.

In our co-pending application, Serial No. 16,898, mentioned above, we have shown a construction which provides a positive safe and continuous means of supplying a lubricant to the flywheel bearings of power presses, in which a lubricating oil is continuously circulated. In our prior construction we provided packing rings which, though satisfactory, after prolonged periods of use were subject to replacement.

One object of this invention is to provide a lubricating system for flywheel bearings of power presses, in which a labyrinth packing, making use of dynamic forces and of gravity, is employed, whereby no wear will be experienced, making it unnecessary to replace the packing materials.

Another object of our invention is to provide a circulating oil system for a flywheel bearing of a power press, in which a lubricant is continuously circulated both during the working cycle of the press and at periods of rest, in a manner in which all oil seals are eliminated.

Other and further objects of our invention will appear from the following description:

In general, our invention contemplates a structure enabling us to introduce lubricating oil under pressure through a duct to a flywheel bearing and continuously to drain lubricating oil therefrom in a manner to supply adequate lubricating oil to a flywheel bearing, not only to lubricate it, but also to carry heat away from it. The inlet duct of the bearing structure is made smaller in diameter than the outlet duct in order to preclude the building up of an excessive level of oil which would overflow the dams, provided to prevent the oil from leaking, in absence of the use of oil seals which we eliminate by our construction. We provide labyrinth packing adapted to co-act with flinger rings adapted to direct the oil through a return path in a manner to prevent it from leaking, and thus escaping to the working surfaces of the clutch and brake structures.

The accompanying drawing forms part of the instant specification and is to be read in conjunction therewith, and shows a sectional elevation through a portion of a power press, showing the flywheel bearing and one embodiment of a lubricating system, in accordance with our improvement.

More particularly referring now to the drawing, a shaft 10 is rotatably carried by a pair of bearings, indicated generally by the reference numerals 12 and 14. The bearing 12 is supported by a pillow block 16, carried by the press frame 18. The bearing 14 is carried by a pillow block 20, supported by the press frame 18. The bearing 14 is comprised by an outer race 22 and inner race 24, and bearing rollers 26. The bearing 12 is constituted by an outer race 28, a pair of inner races 30 and 32, and two sets of bearing rollers 34 and 36. The flywheel 38 is mounted on a bearing indicated generally by the reference numeral 40, which comprises a pair of outer races 42 and 44, and a pair of inner races 46 and 50. A spacer ring 52 maintains the outer races 42 and 44 in separated position. An inner spacer ring 54 maintains the inner races 46 and 50 in spaced position. The clutch housing 56 is carried by the flywheel 38. The clutch member 58 is keyed to the shaft 10 for rotation therewith. The clutch is set by admitting air behind the annular piston 60 to move the clutch plate 62 to clamp the member 58 between the stationary clutch plate 64 and the moveable clutch plate 62. A brake drum 66 is keyed to the shaft 10 by the key 68 and is adapted to be set by the band 70.

Whenever the clutch is connected to the flywheel by the introduction of fluid under pressure through pipe 72, the band 70 is automatically released and the shaft 10 rotates to drive the pinion 74, which meshes with the gear train of the press (not shown), to actuate the press, as is well understood in the art. The flywheel 38 rotates continuously while the shaft 10 will rotate intermittently. Lubricant under pressure is introduced through an opening 76 from a source of oil by means of a pump (not shown). The oil flows into an annular chamber 78, which feeds oil past the bearing rollers 36 and 34. An oil flinger ring 80 is secured to the shaft 10 and adapted to rotate therewith. At those times when the shaft 10 is not rotating, the flinger ring 80 acts as a dam directing the oil into an annular chamber 82, which communicates with the drain duct 84 adapted to drain into an annular drainage chamber 86 formed in the pillow block 16. The annular chamber 86 is drained by a drainage channel 88, with which a pipe 90 communicates. This oil may be allowed to lubricate additional bearings and ultimately finds its way back to a sump (not shown), from which it is recirculated through an appropriate filter. The bearing 14 is lubricated by oil introduced through the opening 92. A flinger ring 142 secured to the shaft 10, and adapted to rotate therewith, acts as a dam when the shaft 10 is not rotating. The oil will flow downwardly and drain through channel 96. Oil will also flow past the rollers 26 and then downwardly by gravity within an oil tight casing 98. This oil likewise drains to the sump for recirculation.

The oil from the annular chamber 78 also flows to the right, as viewed in the drawing, through the space 100 between the pillow block 16 and the shaft, lubricating the rollers 45 of the bearing 49. Oil flows through the annular space between inner spacing ring 54 and outer spacing ring 52 to lubricate the rollers 51 of the bearing 40. A flinger ring 102 is secured to a ring 104 carried by the shaft. When the shaft is stationary the ring 102 acts as a dam similar to ring 80. When the shaft rotates, oil is thrown out by the flinger ring into the annular discharge chamber 106. A plurality of transfer ducts 108 communicate with the flywheel bearing discharge chamber 106, so that oil under the pressure of centrifugal force will flow to the left, as viewed in the drawing, into the annular drainage chamber 86. If the flywheel should be stopped, as for example when press operations are suspended for the night, oil clinging to the walls of the chamber 106 will flow downwardly by gravity. That portion of the chamber which is brought to rest above the axis of the shaft 10 will contain a film of oil which will flow downwardly. An annular bead 110 is formed on a ring member 112 carried by the flywheel. This bead forms a dripping point to the right of the flinger ring 102. The member 104 is formed with an annular groove 114 adapted to act as a drainage channel for the oil dripping off the end of the bead 110. This oil drains on to the inclined surface 116 formed on the ring 112, and overflows into the drainage channel 108. Some slight oil may not be caught by the bead 110. This oil will flow along the inclined surface 117 of the ring 112. This inclined surface is the same as the inclined surface 116, except that it is in the upper position when the flywheel is at rest. The slight amount of oil flowing down this surface will drip from the point 118 at the innermost end of the ring 112 and will flow into the drainage groove 114.

A ring 120 is secured to the flywheel adjacent to pillow block 16. It is provided at its inner surface with a plurality of grooves 122 adapted to act as drainage channels for the drainage of any oil thrown out by centrifugal force during rotation of the flywheel. This oil is adapted to overflow into the annular drainage chamber 86. In event oil by capillary action wets the surface 124, it will drip from the bead 126 into the groove 128, and flow around the groove to drain along the inclined surface 130 into the drainage chamber 86 whenever the flywheel is at rest. When the flywheel is rotating the groove 132 formed in the pillow block will conduct the oil to the inclined surface 130, whence it flows to the drainage chamber 86.

It is to be understood that the openings are so proportioned that the drainage passageways are of larger area than the supply passageway, so that oil will always flow freely to drainage. For example, the height of the flinger ring 80 is such that when the shaft is at rest oil will not flow over the top of the flinger ring but will drain around into the chamber 82. When the shaft 10 is rotating, oil is flung out by centrifugal force into chamber 82, whence it drains. After the shaft has been rotating and is then brought to rest, oil on the upper surface 81 of the groove 82 will flow downwardly by gravity. It is adapted to drip from the bead 134 into a drainage groove 136 formed in the ring 138 secured to the shaft 10. The drainage groove drains into a collecting groove 140, which empties into the groove 82, and thence flows through the duct 84 to the drainage chamber 86.

Normally the drainage grooves 114, 128, and 136 handle only minute quantities of oil, and we have found that the proportions of the grooves are ample to stop leakage in practice. There is a very small quantity of oil in the film in the drainage groove 136 which may be thrown out by centrifugal force when the shaft 10 again rotates after a period of rest. This is collected by the groove 140 and drained to the groove 82 through drainage slot 141. There may be a slight amount of oil that runs down the outer surface of groove 140. This drips off the bead 135 and flows back to the groove 136 when the shaft is at rest.

The construction just described is also applied to the bearing 14, in which a flinger ring 142 is adapted to act as a dam when the shaft is at rest, and to throw oil outwardly by centrifugal force when the shaft 10 is rotating. The member 144 is carried by the pillow block 20, and is provided with a groove 146 and formed with a pair of beads 148 and 150. A drainage groove 152 is formed in the shaft and performs the same function as grooves 136, 128, and 114, just described. Oil collecting in the groove 146 drains through slot 145 to the drainage channel 96.

In operation oil is supplied under pressure through ducts 76 and 92. The oil from duct 76 flows into the annular chamber 78 and then to the left through the interstices between the bearing rollers 36 and the bearing rollers 34. When the clutch is not engaged, the shaft 10 will not be rotating, and the ring 80 will act as a dam so that the oil will be directed downwardly into the annular chamber 82, and flow to the right through duct 84 into the drainage chamber 86, thence through the drainage channel 88 through pipe 90. Oil will also flow from the annular chamber 78 to the right, through the annular space 100, past the bearing rollers 45, through the space between rings 52 and 54, past the bearing rollers 51, and will be constrained by flinger ring 102 acting as a dam into the annular chamber 106, whence it drains through channel 108 into the drainage chamber 86. When the flywheel is stopped, as for suspension of operations for a time, oil on the sides of the chamber 106, at the upper portion of the chamber in the position in which the flywheel is brought to rest, will flow downwardly and drip off bead 110, and flow around the drainage channel 114 for passage through the drainage duct 108. Any oil which seeps by the annular grooves 122 will be thrown into the upper portion of annular chamber 86, and will seep down the side 124 thereof. This oil will drip off bead 126 and flow around the drainage groove 128.

When the shaft 10 rotates, the ring 80 and the ring 102 act as flinger rings and throw oil outwardly into the respective discharge chambers 82 and 106. Oil flowing from the side of the upper portion 81 of chamber 82 will drip from bead 134, and drain through drainage groove 136 which performs a function similar to drainage groove 114.

A similar construction is employed for the oil introduced through duct 92. When the shaft 10 is stationary, the ring 142 acts as a dam, preventing the oil from overflowing. When the shaft rotates, the ring 142 acts as a flinger ring, diverting the oil to the drainage channel 96. Any oil which seeps down the upper inside surface of the member 144 attached to the pillow block 20 will drip off the bead 148 and flow around drainage groove 152 to the drain. The continuous flow of the oil through the bearings not only lubricates them, but helps carry away heat which is transmitted from the clutch and brake structures to the bearings, and some of the heat of friction at the bearings themselves as well. The continuous flow of lubricating oil insures that any foreign matter or dirt which might have become lodged in the assembly will flush clear of the bearings. We eliminate the use of all oil seals by the provision of a labyrinth packing comprising flinger rings and surfaces preventing the migration of oil past drip beads formed thereon. Collecting grooves are provided for the oil which drips from the drip beads, so that this oil may be returned to the system.

It will be seen that we have accomplished the objects of our invention. We have provided a lubricating system for flywheel bearings of power presses in which labyrinth packings making use of dynamic force and of gravity are employed, whereby no wear will be experienced, thus making it unnecessary to replace packing materials periodically. We have provided a circulating oil system for lubricating the flywheel bearing of a power press in which a liquid lubricant is continuously circulated both during the working cycle of the press and during periods of rest, in a manner in which oil seals subject to wear are eliminated.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A power press flywheel bearing assembly including in combination a power press frame, a shaft bearing supported by the frame, a press shaft journaled in the shaft bearing, a flywheel bearing mounted on the shaft, a flywheel rotatably mounted on the flywheel bearing, a lubricant supply chamber carried by the frame, means for introducing lubricant into the supply chamber, means providing communication between the lubricant supply chamber and the shaft and flywheel bearings, an annular lubricant discharge chamber positioned adjacent the shaft bearing, an annular lubricant discharge chamber positioned adjacent the flywheel bearing, a drainage chamber carried by the frame, means providing communication between the shaft bearing discharge chamber and the drainage chamber, means providing communication between the flywheel bearing discharge chamber and the drainage chamber, a ring mounted on the shaft for rotation therewith adjacent the shaft bearing discharge chamber adapted to act as a dam when the shaft is stationary and as a flinger ring when the shaft is rotating to direct lubricant into the annular discharge chamber, and a second ring mounted on the shaft for rotation therewith adjacent the flywheel bearing discharge chamber adapted to act as a dam when the shaft is stationary and as a flinger ring when the shaft is rotating to direct lubricant into the flywheel bearing discharge chamber.

2. An assembly as in claim 1 in which the side wall of the shaft bearing discharge chamber is formed with a drip bead, means forming a drainage channel positioned below said drip bead adapted to drain lubricant falling from the drip bead to the shaft bearing discharge chamber.

3. An assembly as in claim 1 in which the flywheel bearing lubricant discharge chamber is formed with a drip bead, means forming a drainage channel positioned below said drip bead adapted to drain lubricant falling from the drip bead to the flywheel bearing discharge chamber.

4. An assembly as in claim 1 in which said drainage chamber is annular in form, a ring secured to the flywheel of the press extending toward said drainage chamber, said ring being formed with a plurality of longitudinally spaced grooves along its surface adjacent the axis of rotation of the flywheel, said grooves being adapted to prevent migration of lubricant.

5. An assembly as in claim 1 in which said drainage chamber is annular in form, a ring secured to the flywheel of the press extending toward said drainage chamber, said ring being formed with a plurality of longitudinally spaced grooves along its surface adjacent the axis of rotation of the flywheel, said grooves being adapted to prevent migration of lubricant, the upper portion of said drainage chamber being formed with a drip bead and a drainage groove formed upon the ring adapted to drain lubricant falling from said drip bead to the drainage chamber.

6. A power press flywheel bearing assembly including in combination a power press frame, a shaft bearing supported by the frame, a press shaft journaled in the shaft bearing, a flywheel bearing mounted on the shaft, a flywheel rotatably mounted on the flywheel bearing, a lubricant supply chamber carried by the frame, means for introducing lubricant into the supply chamber, means providing communication between the lubricant supply chamber and the flywheel bearing, an annular lubricant discharge chamber positioned adjacent the flywheel bearing, a drainage chamber carried by the frame, means providing communication between the flywheel bearing discharge chamber and the drainage chamber and a ring mounted on the shaft for rotation therewith adjacent the flywheel bearing discharge chamber adapted to act as a dam when the shaft is stationary and as a flinger ring when the shaft is rotating the direct lubricant into the flywheel bearing discharge chamber.

PHILO H. DANLY.
VASIL GEORGEFF.

REFERENCES CITED

The following references are of record in the file of this patent:

UNITED STATES PATENTS

| Number | Name | Date |
|---|---|---|
| 1,385,906 | Crutchfield | July 26, 1921 |
| 2,430,127 | Kronenberg | Nov. 4, 1927 |